United States Patent [19]
Miwa

[11] Patent Number: 5,182,576
[45] Date of Patent: Jan. 26, 1993

[54] RASTER SCANNING APPARATUS

[75] Inventor: Katsumi Miwa, Osaka, Japan

[73] Assignee: Minolta Camera Co., Ltd., Osaka, Japan

[21] Appl. No.: 504,874

[22] Filed: Apr. 5, 1990

[30] Foreign Application Priority Data

Apr. 7, 1989 [JP] Japan .................................. 1-89275

[51] Int. Cl.⁵ ............................................. H04N 1/21
[52] U.S. Cl. ..................................... 346/108; 354/410
[58] Field of Search .................. 346/108, 102 R, 160; 354/410, 411, 412

[56] References Cited

U.S. PATENT DOCUMENTS 4,676,616  6/1987  Hoda ..................................... 354/410
4,876,556  10/1989  Ohara ..................................... 346/108

FOREIGN PATENT DOCUMENTS 60-169272  9/1985  Japan .

Primary Examiner—Mark J. Reinhart
Attorney, Agent, or Firm—Price, Gess & Ubell

[57] ABSTRACT

A raster scanning apparatus for scanning a photosensitive material by modulated laser beam, the raster scanning apparatus capable of changing the picture element density of images to be formed on the photosensitive material via raster scanning in accordance with the degree of photosensitivity of designated photosensitive material.

8 Claims, 3 Drawing Sheets

RASTER SCANNING APPARATUS

BACKGROUND OF THE INVENTION

1. Field of the Invention

The present invention relates to laser printer exposure control, and more specifically relates to a raster scanning apparatus capable of changing picture element density.

2. Description of the Related Arts

Conventional raster scanning apparatus expose/scan using a modulated laser beam with a polygon mirror or the like to form an image on a photosensitive material in accordance with image data. In conventional raster scanning apparatus the photosensitive material used is a silver salt film or silver salt paper or the like. The degree of photosensitivity possessed by the aforesaid photosensitive materials changes according to the type of material used. For example, silver salt films and silver salt paper have sensitivity ratios of about 1:2. (Silver salt paper has about double the sensitivity of silver salt film.) Accordingly, image density will vary for the same raster scanning apparatus depending on the type of photosensitive material used for image forming. Thus, the laser power must be optically or electrically modified to produce same density images on photosensitive materials having different degrees of photosensitivity.

Changing laser power in accordance with the sensitivity of the photosensitive material has the disadvantage of producing influences based on the precision of the laser detecting sensors. That is, the laser detecting sensor cannot monitor a broad range of laser output frequencies with any degree of precision. Further, this lack of broad range monitoring capability leads to cost increases for the apparatus.

SUMMARY OF THE INVENTION

Accordingly, a main object of the present invention is to provide an improved raster scanning apparatus capable of eliminating the previously described disadvantages.

A further object of the present invention is to provide a raster scanning apparatus compatible with various types of photosensitive materials.

A still further object of the present invention is to provide an economical raster scanning apparatus compatible with various types of photosensitive materials.

An even further object of the present invention is to provide a raster scanning apparatus capable of changing the scanning density in accordance with the type of photosensitive material used.

These and other objects are attained by a raster scanning apparatus for scanning a photosensitive material by modulated laser beam, the apparatus providing:

output means for outputting the modulated laser beam in accordance with image signals;

raster scanning means including laser scanning means for scanning of the photosensitive material in a main scanning direction, and advancing means for advancing the photosensitive material in a secondary scanning direction;

designating means for designating the type of the photosensitive material; and control means for controlling the output means and the raster scanning means to change the picture element density on the photosensitive material in accordance with the type of photosensitive material.

In another aspect of the present invention, a raster scanning apparatus provides an output means for outputting a modulated laser beam in accordance with image signals, a discrimination means for determining the type of photosensitive material scanned by the laser, and a means for changing the picture element density via laser scanning in accordance with the type of discriminated photosensitive material.

In a further aspect of the present invention, a raster scanning apparatus provides an output means for outputting a modulated laser beam in accordance with image signals, a discrimination means for determining the type of photosensitive material scanned by the laser, a means for multiple-pass scanning by the same image signals, and a means to change the number of scan passes according to the same image signals based on the type of discriminated photosensitive material.

In a yet further aspect of the present invention, a raster scanning apparatus provides an output means for outputting a modulated laser beam in accordance with image signals, a discrimination means for determining the type of photosensitive material scanned by the laser, and an idling means for stopping the laser scan at a specific spacing interval according to the type of discriminated photosensitive material.

BRIEF DESCRIPTION OF THE DRAWINGS

These and other objects or features of the present invention will become apparent from the following description of the preferred embodiments thereof taken in conjunction with the accompanying drawings, in which.

In the following description, like parts are designated by like reference numbers throughout the several drawings.

DESCRIPTION OF THE PREFERRED EMBODIMENT

The preferred embodiments of the present invention are described hereinafter by way of examples with reference to the accompanying drawings. In the descriptions of the embodiments below, silver salt film and silver salt paper (photosensitivity ratio of 1:2) are used as examples of photosensitive materials.

(1) First Example

Figure 1:
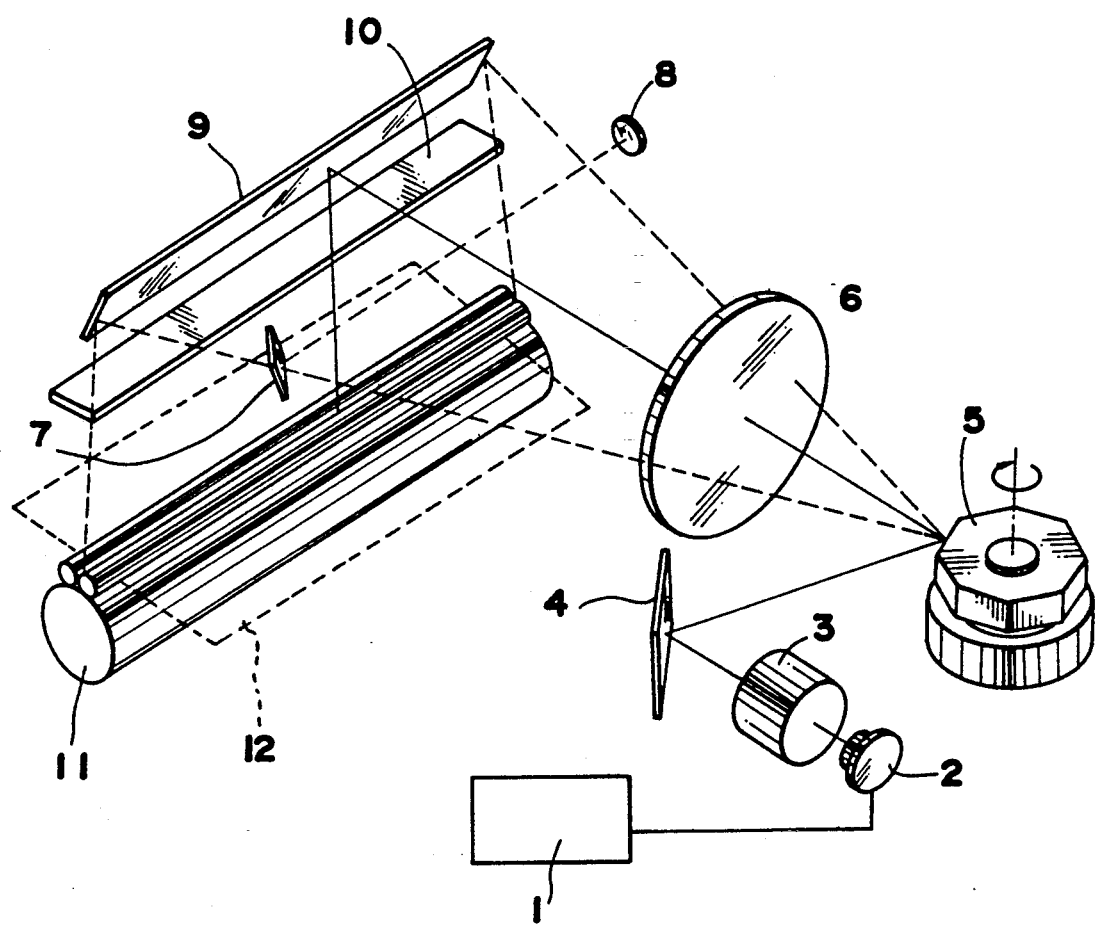
FIG. 1 is a perspective view showing the basic construction of a raster scanning apparatus.

FIG. 1 shows the basic construction of a raster scanning apparatus. Laser light, which is generated from laser diode 2 and modulated by laser diode drive circuit 1, is focused into a parallel beam by collimating lens 3, then is reflected by mirror 4 to the reflective surface of polygon mirror 5 which is rotatable at high speed. The direction scanned by the beam reflected from the reflective surface of polygon mirror 5 is the main scan direction. That is, a laser beam is reflected by polygon mirror 5, converged by fθ lens 6, and directed by mirror 9 through window glass 10 onto the surface of photosensitive material 12.

Then, photosensitive material 12 is advanced perpendicularly to the aforesaid main scanning direction (in the secondary scanning direction) so as to form an electrostatic latent image thereon. Item 8 in FIG. 1 is a laser detecting sensor used to determine the starting position for the main scan. Item 7 in the drawing is a mirror used to direct the laser beam to the aforesaid detecting sensor 8.

First, terms will be defined to avoid confusion.

Beam scanning frequency: value expressing the actual number of lines scanned per second on the photosensitive material in the main scan direction (lines/sec).

Secondary scanning speed: speed at which the photosensitive material is transported in the secondary scan direction (inches/sec).

Image output frequency: value expressing the number of image lines with dissimilarities output per second to the photosensitive material (lines/sec). (For example, when the same image is output twice, it is counted as one line. The beam scanning frequency, however, is two lines.)

Scan line pitch: spacing interval of the scanning beam on the photosensitive material.

Image line pitch: spacing interval of the image lines (dissimilar line of the image) on the photosensitive material.

The parameters (beam scanning frequency, image output frequency, secondary scanning speed, scan line pitch, image line pitch) for the silver salt paper and silver salt film used in the first example are described in Table 1 below.

TABLE 1

| Photosensitive Material Parameters | Silver Salt Paper | Silver Salt Film |
|---|---|---|
| Beam scanning frequency | 600 lines/sec | 600 lines/sec |
| Image output frequency | 600 lines/sec | 300 lines/sec |
| Secondary scanning speed | 2 inches/sec | 1 inch/sec |
| Scan line pitch | 85 μm | 42.5 μm |
| Image line pitch | 85 μm | 85 μm |

Figure 3A:
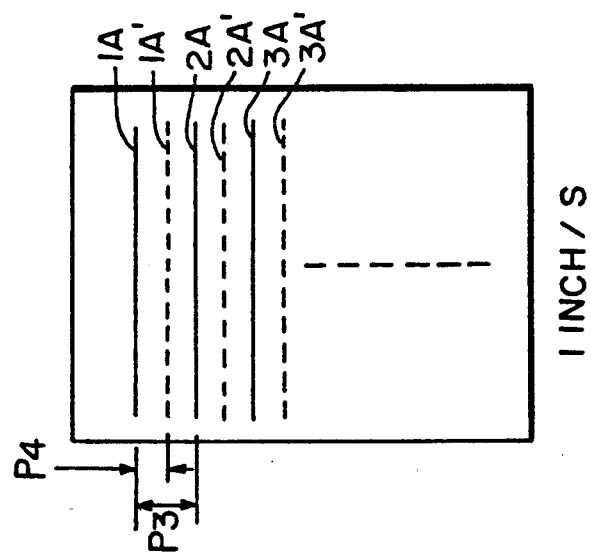
FIGS. 3a, 3b, 3c are respective illustrations of paper film and paper scanning state on the photosensitive material.
Figure 3B:
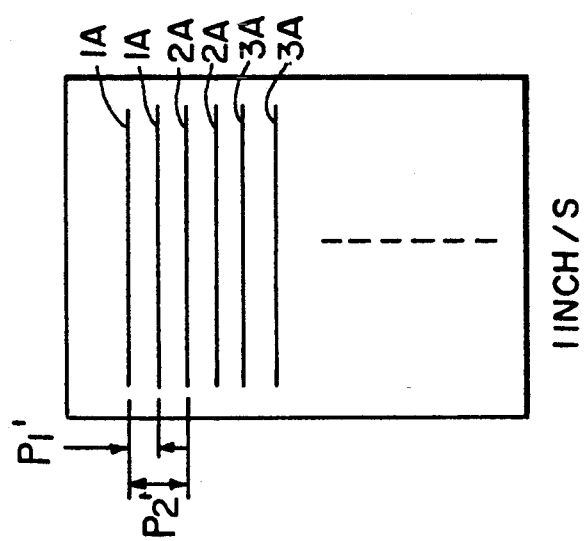
Figure 3C:
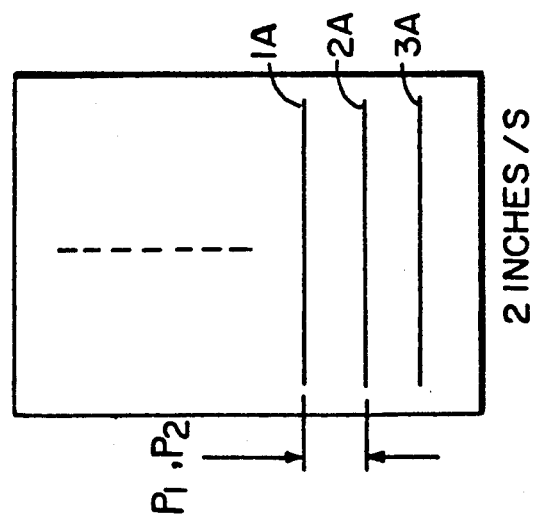

FIGS. 3A and 3B show the actual imaging states for silver salt paper and silver salt film as specified in Table 1. The lines labeled 1A, 2A, 3A and the like in the drawings indicate identical images. (FIG. 3C shows another example described later.)

FIG. 3A shows image forming on silver salt paper, wherein the scan line pitch P1 and image line pitch P2 are in agreement.

In the case of silver salt film, on the other hand, the scan line pitch P1' is only one half the width of the scan line pitch for paper (P1'=½P1) because the secondary scanning speed is half that for paper. Further, image line pitch P2' for film has the same value as the image line pitch for paper because the same line is repeated twice.

The aforesaid circumstances indicate that the picture element points forming identical images are twice as dense when silver salt film is used compared to when silver salt paper is used.

That is, the image output frequency and secondary scanning speed can be changed without changing the beam scanning frequency or rotational speed of the polygon mirror. When silver salt film is used as the photosensitive material, the scan of one line of image data is repeated twice by two adjacent faces of the polygon mirror.

Figure 2:
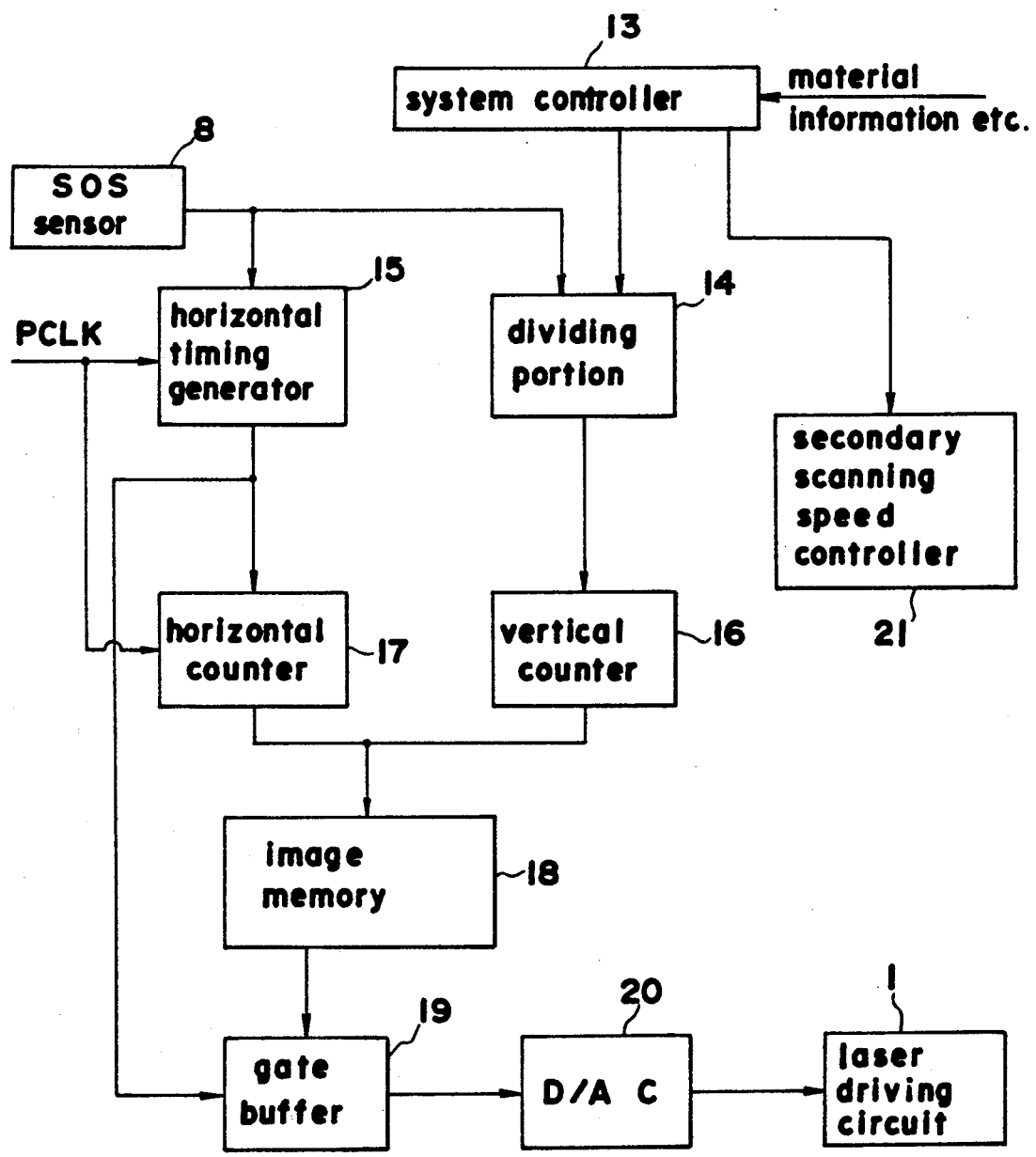
FIG. 2 is a block diagram of the control circuit of the raster scanning apparatus of the present invention.

The control circuit is hereinafter described with reference to FIG. 2. In the drawing, the PCLK signal is a clock signal relating to single successive picture elements, and the SOS signal is a start-of-scan signal input from the laser detecting photosensor 8 in FIG. 1.

One page of image information can be written to image memory 18. For example, the capacity of image memory 18 is 16 megabytes allotted as 8-bits per dot with 4096×4096 dots per page. The addresses of the memory are set so the high level 12-bit segment is addressed vertically and the low level 12-bit segment is addressed horizontally.

On the other hand, the photosensitive material information is input first by the operator who specifies silver salt paper or silver salt film. as the photosensitive material. This information may also be input automatically by using a bar code or the like on the surface of the magazine accommodating the photosensitive material. The information on the photosensitive material is then transmitted to system controller 13.

System controller 13 outputs instructions to secondary scanning speed controller portion 21 to scan at a speed of 2 inches/sec for silver salt paper and 1 inch/sec for silver salt film. System controller 13 also outputs instructions to dividing portion 14 to divide the start-of-scan signal SOS by 1/n. When silver salt paper is used as the photosensitive material in the aforesaid example, $n=1$, and $n=2$ when silver salt film is used.

When entering the print cycle, horizontal reading counter 17 and vertical reading counter 16 are cleared, and await the input of the start-of-scan signal SOS. When the first start-of-scan signal SOS is input, horizontal timing generator 15 starts to count the clock signals PCLK, and when the total counted signals reach a predetermined value an instruction is output to start the image region to horizontal reading counter 17 and gate buffer 19.

In the image region, horizontal reading counter 17 increments in accordance with the clock signals PCLK. On the other hand, address data corresponding to the top of image memory 18 are output in accordance with clock signals PCLK through gate buffer 19 to digital-to-analog (DA) converter 20 where said address data are converted to analog signals. These analog signals are then input to laser driving circuit 1 where they actuate the output modulation of laser diode 2.

When the modulation signal output for one line of image information is completed in the image region, horizontal timing generator 15 instructs the completion of horizontal reading counter 17 and gate buffer 19. Thus, the count of clock signals PCLK by horizontal reading counter 17 is terminated, gate buffer 19 is closed, and the next start-of-scan signal SOS is awaited.

On the other hand, when silver salt paper is used as the photosensitive material the start-of-scan signal SOS is not divided prior to input to vertical reading counter 16, and dividing portion 14, which divides the signal by ½ for silver salt film, is not actuated. That is, the start-of-scan signal is input to vertical reading counter 16 each time when silver salt paper is used as the photosensitive material, but is input only one time when silver salt film is used.

Accordingly, when silver salt film is used as the photosensitive material the aforesaid first start-of-scan SOS signal is output from laser detecting photosensor 8 and the first scan is performed. Thereafter, the address signal output to image memory 18 from vertical reading counter 9 is not counted even though a second start-of-scan signal SOS is output from laser detecting photosensor 8. Therefore, the same data as the first time is read from image memory 8, and a second scan is performed using the reflective surface of polygon mirror 5 which is adjacent to the reflective surface used for the first scan.

Put another way, dividing portion 14 and vertical reading counter 16 comprise a modulation signal replicating output means for repeating the output of an identical one-line modulation signal based on identical image information.

(2) Second Example

Although the secondary scanning speed was changed in the previously described example, exposure control is also possible by a method wherein the secondary scanning speed is not changed. Scan line density can be changed by switching OFF the laser output for every alternate line when high-sensitivity photosensitive material (to wit, silver salt paper) is used, compared to when low-sensitivity photosensitive material (to wit, silver salt film) is used.

For example, when silver salt paper is used as the photosensitive material, the laster output is switched OFF for each alternate scan line (1-line) so that the actual beam scanning frequency is 300 lines/sec; when film is used, the output is repeated twice and the image output is 300 lines/sec. In either case the secondary scanning speed is 1 line/sec.

The aforesaid correspondence is illustrated in Table 2. In addition, FIG. 3C shows the scan line state when silver salt paper is used in this example. Image line pitch P3 is double the scan line pitch P4 because scan line pitch P4 is terminated with each scan.

TABLE 2

| Silver Salt Paper | | Silver Salt Film | |
|---|---|---|---|
| Scan Line No. | Image Line No. | Scan Line No. | Image Line No. |
| 1 | 1 | 1 | 1 |
| 2 | OFF | 2 | 1 |
| 3 | 2 | 3 | 2 |
| 4 | OFF | 4 | 2 |
| 5 | 3 | 5 | 3 |
| 6 | OFF | 6 | 3 |
| 7 | 4 | 7 | 4 |
| 8 | OFF | 8 | 4 |
| 9 | 5 | 8 | 5 |
| 10 | OFF | 10 | 5 |
| * | * | * | * |
| * | * | * | * |
| * | * | * | * |

When silver salt film is used, on the other hand, scanning is identical to that shown in FIG. 3B of the first example.

Accordingly, when the parameters for silver salt paper and silver salt film are compared, it is clear the exposure energy per unit of surface area is double for film compared to paper.

To further understanding of the aforesaid examples, the numerical correspondences for the first and second examples are given in Table 3 below.

TABLE 3

| | (a) | (b) | (c) |
|---|---|---|---|
| Beam Scan Frequency | 600 lines/s | 600 lines/s | 300 line/s |
| Image Output | 600 lines/s | 300 lines/s same data | 300 line/s |

TABLE 3-continued

| | (a) | (b) | (c) |
|---|---|---|---|
| Frequency Secondary Scan Speed | 2 inches/s | twice 1 inch/s | 1 inch/s |
| Scan Line Pitch | 85 μm | 42.5 μm | 85 μm |
| Image Line Pitch | 85 μ | 85 μm | 85 μm |

(3) Third Example

Data interpolation is possible when a single image line is formed by multiple scan lines. The aforesaid interpolation is accomplished by calculating interpolation data to interpolate between the image data lines.

Data interpolation may be considered supplying a portion of the original image data (for example, odd-numbered lines only) when scanning a photosensitive material, said interpolation being the identical replication (twice) of a portion of the aforesaid image data (for example, identical odd-numbered lines), with a separate interpolation for supplying the remaining original image data (for example, even-numbered lines). The aforesaid separate interpolation may be considered supplying new image data (for example, averaged data from previous and following lines) when interpolating identical image data between the lines of original image data (for example, replicating all lines twice).

Image quality can be improved in the perpendicular direction relative to the primary scanning direction by means of the aforesaid data interpolation.

(4) Fourth Example

Although a single image element was repeated twice in the scanning process of the previously described first example, when the sensitivity ratio of high-sensitivity photosensitive material and low-sensitivity photosensitive material is N:1, the secondary scanning speed of the high-sensitivity material can be accelerated N fold compared to the secondary scanning speed of the low-sensitivity material, while the number of repeated scans per image line is N fold greater when low-sensitivity material is used compared to high-sensitivity material. Thus, the exposure energy can be equalized per unit of surface area of the photosensitive material even when the sensitivity ratio is N:1.

The concept of the second example is applicable when the high-sensitivity and low-sensitivity photosensitive materials have a sensitivity ratio of N:1. In such a case, the number of times the laser is switched OFF may be increased for high-sensitivity materials so as to equalize the exposure energy per unit of surface area of both high- and low-sensitivity photosensitive materials. Further, exposure energy per unit area can be regulated by switching OFF laser output a specified interval in the main scanning direction.

As heretofore explained, the raster scanning apparatus of the present invention can adjust for differences in sensitivity of photosensitive materials by changing the image scanning density without requiring that the laser power be modified to correspond to the photosensitive material. Accordingly, strict standards for a laser output attenuator are not required.

Further, low-sensitivity photosensitive materials can be accommodated with a low power light source by forming a 1-line image with a plurality of scan lines.

Still further, image quality can be improved perpendicularly to the main scanning direction by interpolating data when forming a 1-line image with a plurality of scan lines.

Large differences in sensitivity of photosensitive materials can be accommodated without modifying the optical system or scanning system, and without complicating the mechanics or optical system for the raster scanning apparatus.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A raster scanning apparatus for scanning a photosensitive material by a modulated laser beam, comprising:
   output means for outputting the modulated laser beam in accordance with image signals;
   raster scanning means including laser scanning means for scanning of the photosensitive material in a main scanning direction, and advancing means for advancing the photosensitive material in a secondary scanning direction;
   designating means for designating the type of the photosensitive material; and
   control means for controlling the output means and the raster scanning means to change picture element density of images to be formed on the photosensitive material in accordance with the designated type of the photosensitive material, thereby forming substantially the same exposure results irrespective of the type of the photosensitive material.

2. A raster scanning apparatus of claim 1, wherein said type of photosensitive material is classified in accordance with the degree of the photosensitivity of the photosensitive material.

3. A raster scanning apparatus for scanning a photosensitive material by a modulated laser beam, comprising:
   output means for outputting the modulated laser beam in accordance with image signals;
   designating means for designating the degree of the photosensitivity of the photosensitive material; and
   changing means for changing picture element density via raster scanning in accordance with the designated degree of the photosensitivity of the photosensitive material.

4. A raster scanning apparatus for scanning a photosensitive material by a modulated laser beam, comprising:
   output means for outputting the modulated laser beam in accordance with image signals;
   designating means for designating the type of the photosensitive material; and
   means for multiple pass scanning by the same image signal; and
   changing means for changing the number of scan passes according to the same image signal based on the designated type of the photosensitive material.

5. A raster scanning apparatus for scanning a photosensitive material by a modulated laser beam, comprising:
   output means for outputting the modulated laser beam in accordance with image signals;
   designating means for designating the type of the photosensitive material; and
   idling means for stopping the raster scan at a specific spacing interval according to the designated type of the photosensitive material.

6. A raster scanning apparatus for scanning a photosensitive material by a modulated laser beam, comprising:
   output means for outputting the modulated laser beam in accordance with image signals;
   scanning means including laser scanning means for scanning of the photosensitive material in a main scanning direction, and advancing means for advancing the photosensitive material in a secondary scanning direction;
   detecting means for detecting the degree of the photosensitivity of the photosensitive material; and
   control means for controlling the output means and scanning means to change the density of images to be formed on the photosensitive material so as to adapt the detected degree of the photosensitive material.

7. A method of controlling a raster scanning apparatus for scanning a photosensitive material by a modulated laser beam, comprising the steps of:
   detecting the degree of the photosensitivity of the photosensitive material;
   changing the picture element density in accordance with the detected degree of photosensitivity; and
   performing raster scanning with the changed picture element density.

8. A raster scanning apparatus for scanning a photosensitive material by a modulated laser beam, comprising:
   output means for outputting the modulated laser beam in accordance with image signals at a constant intensity;
   designating means for designating the type of photosensitivity of the photosensitive material;
   scanning means for scanning the photosensitive material with the modulated laser beam at a constant intensity regardless of the photosensitive material, and
   control means, responsive to the designating means, for changing one of the scanning speed and the number of scans to provide a corresponding exposure energy at a constant intensity that is appropriate for the type of photosensitivity of the photosensitive material.

* * * * *